United States Patent [19]

Manor

[11] Patent Number: 4,700,191

[45] Date of Patent: Oct. 13, 1987

[54] RADAR WARNING RECEIVER

[76] Inventor: Dan Manor, 34 Gluskin Street, Rehovot, Israel

[21] Appl. No.: 839,997

[22] Filed: Mar. 17, 1986

[30] Foreign Application Priority Data

Apr. 14, 1985 [IL] Israel ........................................ 74887

[51] Int. Cl.⁴ ................................................ G01S 7/40
[52] U.S. Cl. ...................................... 342/13; 342/20; 340/502; 455/49; 455/227; 455/349
[58] Field of Search ..................... 342/20, 21, 27, 29, 342/69, 70; 340/901, 902, 904, 905, 52 F, 500–502, 540, 565, 567, 825.06, 825.36, 908; 455/49, 66, 67, 132, 150, 160, 161, 168, 188, 196, 197, 199, 226–230, 344, 345, 349

[56] References Cited

U.S. PATENT DOCUMENTS

| | | | |
|---|---|---|---|
| 2,862,204 | 11/1958 | Henrici et al. | 342/20 X |
| 2,939,135 | 5/1960 | Beckerich et al. | 342/29 |
| 3,660,844 | 5/1972 | Potter | 342/20 |
| 3,842,397 | 10/1974 | Sindle | 340/904 X |

Primary Examiner—T. H. Tubbesing
Assistant Examiner—Bernarr Earl Gregory
Attorney, Agent, or Firm—Benjamin J. Barish

[57] ABSTRACT

A radar warning receiver for detecting and analyzing radar signals comprises a plurality of RF heads each tuned to a predetermined frequency band and connected to an antenna covering a preselected sector of reception of radar signals. Each of the heads includes a frequency converter converting the received signals to a common frequency base-band and producing an output signal in the base-band corresponding to the signal received by its antenna. The radar receiver also includes a central receiver unit receiving the signals from the RF heads, the central receiver unit comprising a plurality of channels, one of each RF head, for receiving and processing the signals from the respective head; and mode selector means for selectively switching the central receiver unit to operate according to: (a) an Acquisition Mode, wherein the plurality of channels are connected to cover contiguous sub-bands of the base-band; or (b) an Analysis Mode, wherein the plurality of channels are connected in parallel to cover the same sub-band of the base-band.

20 Claims, 8 Drawing Figures

: RWR GENERAL BLOCK DIAGRAM

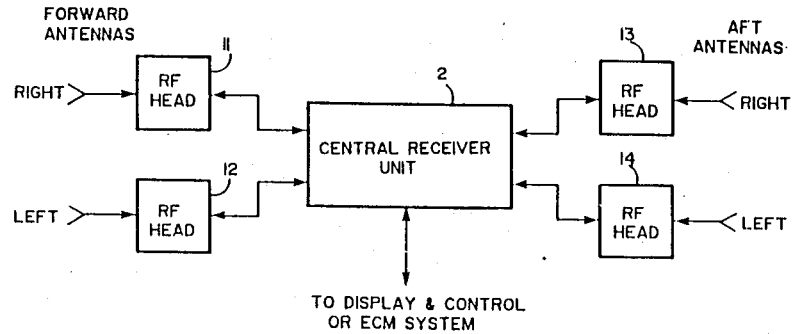
FIG. 1 : RWR GENERAL BLOCK DIAGRAM
FIG. 2 : RF HEAD SCHEMATIC DIAGRAM
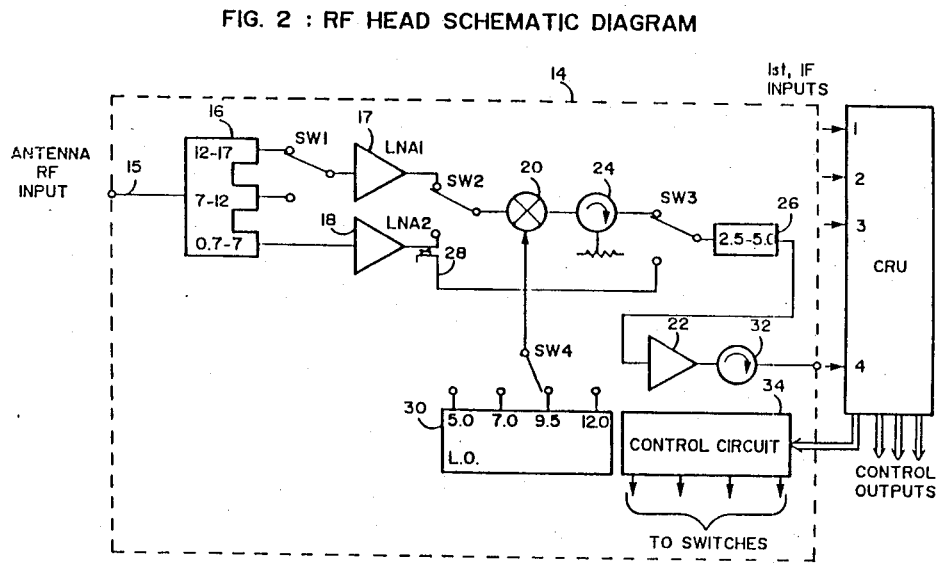

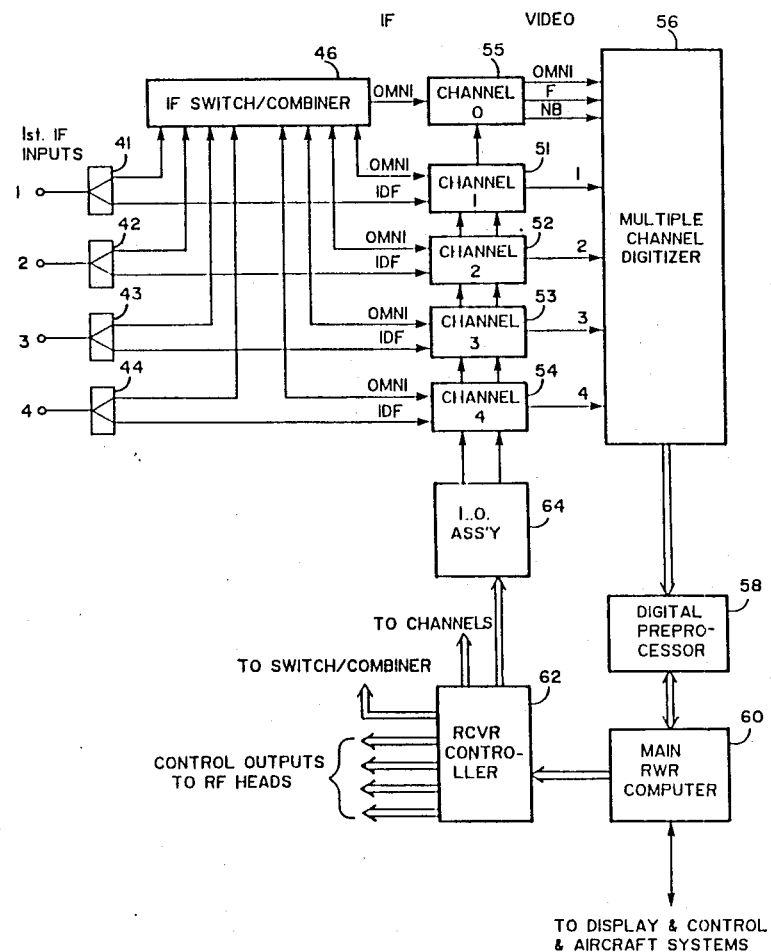
FIG. 3 : CENTRAL RECEIVER UNIT
- BLOCK DIAGRAM

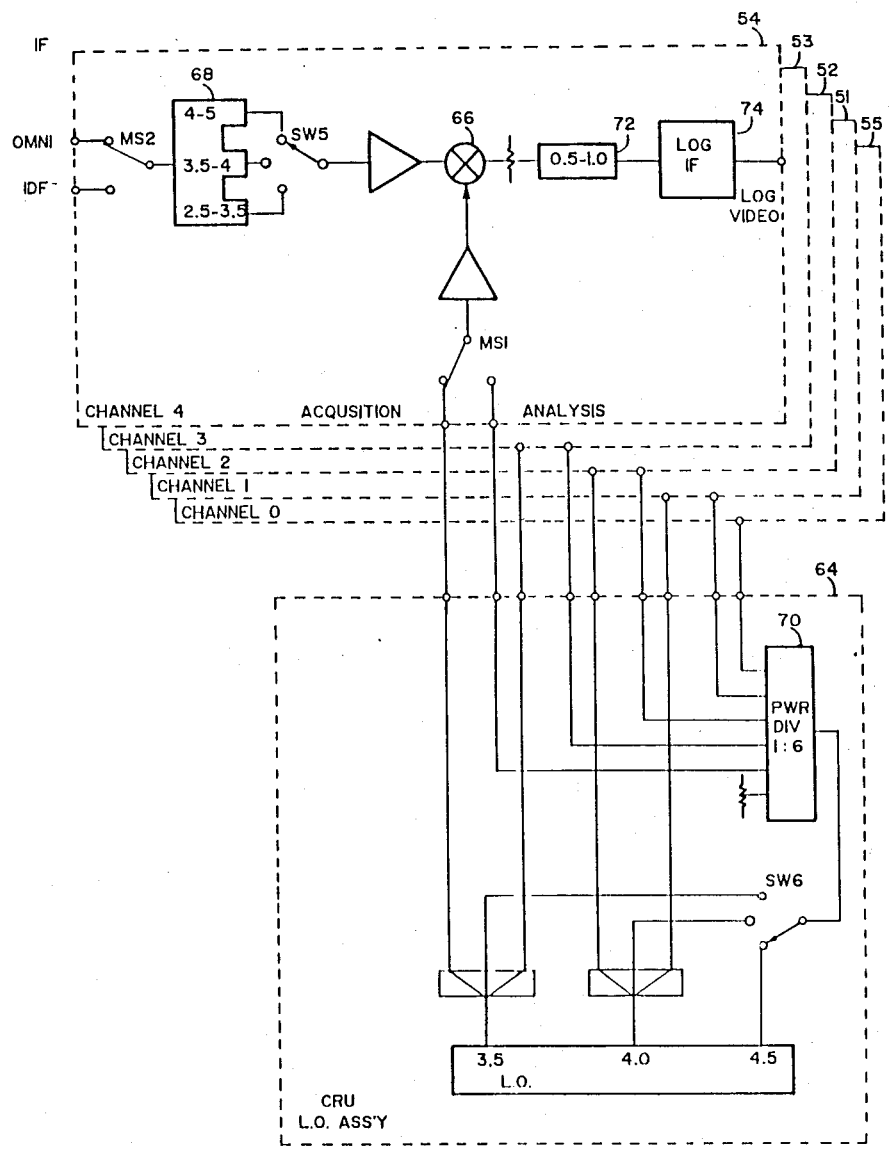
FIG. 4 : CHANNELS 1-4 & L.O. ASS'Y SCHEMATIC DIAGRAM

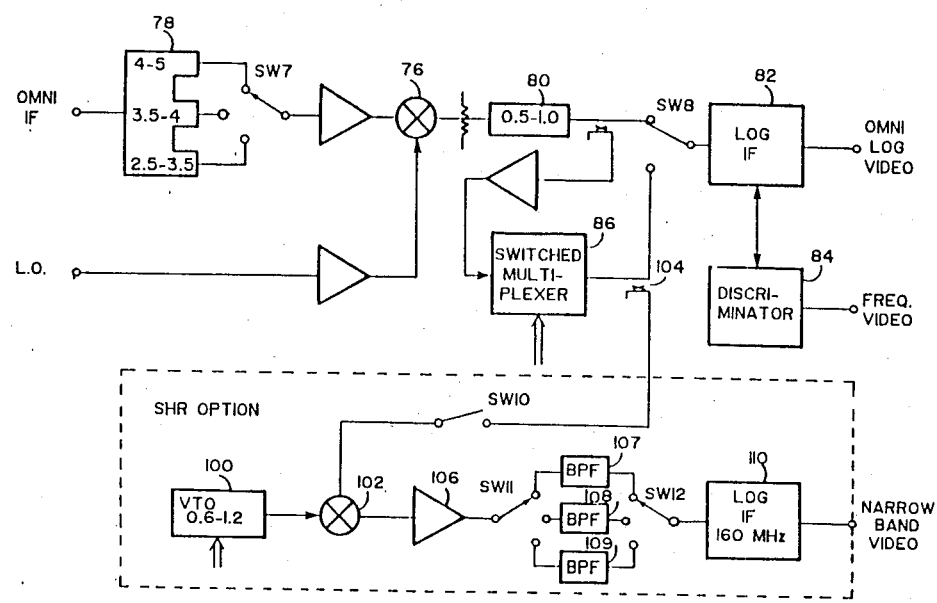
FIG. 5 : CHANNEL 0 SCHEMATIC DIAGRAM (INCL. SHR OPTION)
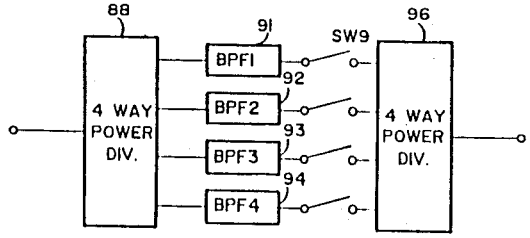
FIG. 6 : SWITCHED MULTIPLEXER SCHEMATIC DIAGRAM

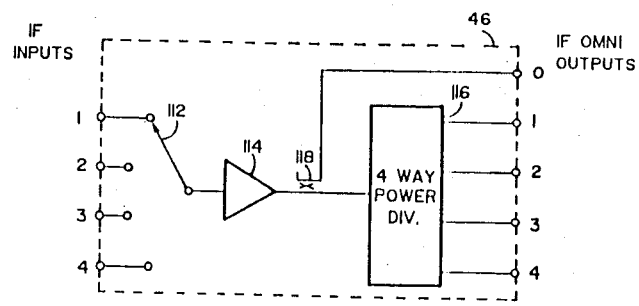
FIG. 7 : IF SWITCH/COMBINER SCHEMATIC DIAGRAM
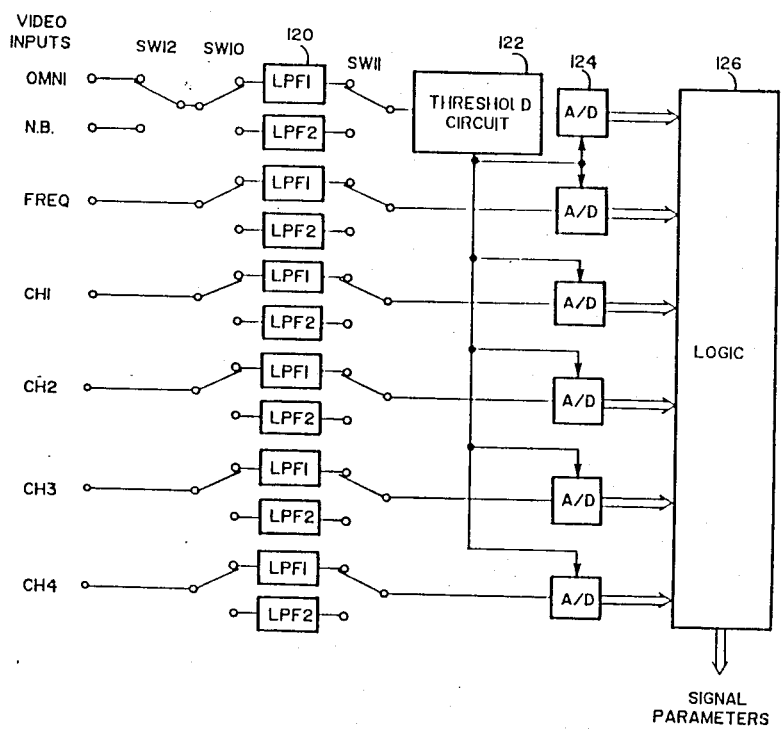
FIG. 8 : DIGITIZER SCHEMATIC DIAGRAM

RADAR WARNING RECEIVER

BACKGROUND OF THE INVENTION

The present invention relates to radar warning receivers for detecting and analyzing radar signals. The invention is particularly applicable to radar warning receivers for installation into military aircraft to provide self-protection to the aircraft against radar guided threats, such as air-to-air or surface-to-air missiles, and the invention is therefore described below with respect to this application.

Radar warning receivers provided on military aircraft must not only detect the radar signals but must also determine a number of their parameters, e.g., direction, frequency, amplitude, time of arrival, and pulse width. These parameters must be measured quickly in order to enable the aircraft to counter the threat by avoiding it or by activating various electronic countermeasures. For this purpose, an ideal radar warning receiver must have a number of characteristics including the following: automatic operation; high sensitivity, to detect threats while still at a distant range; high reliability, to provide high probability of intercept and low probability of false alarm; good coverage, to have a large frequency band width to cover all threats, good angular coverage to protect the aircraft from every direction, and large dynamic range to protect against weak or strong signals; fast operation, to provide readiness for the appearance of a new threat; accuracy, to provide accurate identification and direction finding; protection against spurious and other signals, to enable full performance in a dense-signal environment; simple to install in different aircraft, to integrate with other systems, and to maintain; and low cost construction susceptible to volume production.

The emergence of new radar types and technologies poses a host of problems to the radar warning receiver which current systems find difficulty in meeting. Thus, the newly developed PD (pulse doppler), SPSP (spread spectrum), TWS (track while scan), FA (frequency agility), and PRI (pulse repetition interval) agility radar systems impose new and harsh requirements for the modern radar warning receiver.

There are many basic receiver types in use today, but all have their drawbacks: Thus, the crystal video receiver (CVR) cannot measure frequency, is of low sensitivity, and cannot operate in dense environments; the instantaneous frequency monitor (IFM), which is an enhancement to the CVR, provides it with frequency measurement capability, but it is of relatively low sensitivity and of little protection for operating in a dense environment. The superheterodyne (or superhet) receiver (SHR) does achieve the required sensitivity and protection, but its low probability of intercept, and its inability to handle frequency-agile radars, make it outdated. The channelized receiver (CR) combines high sensitivity with high probability of intercept, and is well protected, but its complexity and high cost make it an unlikely choice, especially when it needs to be multiplied to enable direction-finding.

Many existing radar warning receivers employ a combination of two or more of the foregoing receiver types in order to compensate for the shortcomings of each type; but such combinations cannot fully complement each other, and the total resulted performance is not the best of each. In addition, in order to perform the instantaneous direction finding (IDF) function, several identical receivers are necessary to measure the same signal simultaneously. Thus, many radar warning receiver systems include a plurality of crystal video receivers for the IDF function because of the simplicity and low cost of this receiver, but the IDF parameter, which is probably the most important parameter, is thereby sacrificed with respect to weak signals, and such combination systems are therefore quickly degraded in dense signal environments.

BRIEF SUMMARY OF THE INVENTION

An object of the present invention is to provide a radar warning receiver having advantages in many or all of the above respects. More particularly, an object of the present invention is to provide a new architecture for a radar warning receiver capable of imparting to the receiver a high sensitivity, high dynamic range, good protection for reliable and total parameter and direction measurement of signals in a dense signal environment, and quick response time, and further capable of flexibility in deployment, miniaturization, and manufacture at low cost and in volume.

According to a broad aspect of the present invention, there is provided a radar warning receiver for detecting and analyzing radar signals, comprising: a plurality of RF heads each tuned to a predetermined frequency band and connected to an antenna covering a preselected sector of reception of radar signals, each of said heads including a frequency converter converting the received signals to a common frequency base-band and producing an output signal in said base band corresponding to the signal received by its antenna; and a central receiver unit receiving said signals from the RF heads; said central receiver unit comprising: a plurality of channels, one for each RF head, for receiving and processing the signals from the respepective head; and mode selector means for selectively switching said central receiver unit to operate according to:

(a) an Acquisition Mode, wherein said plurality of channels are connected to cover contiguous sub-bands of said base band; or (b) an Analysis Mode, wherein said plurality of channels are connected in parallel to cover the same sub-band of said base band.

More particularly, the plurality of channels include a head-channel for each RF head, for receiving and processing the signals from the respective head; and an O-channel for receiving and processing the signals from all the RF heads combined; and wherein said central receiver unit further includes: splitting means for splitting the signals from each RF head to produce a directional signal from each head and an omni-signal derived by combining the base band signals from all said heads; and means for feeding the directional signals of each head to its respective channel, and the omni-signal to all the channels and to said O-channel; said mode selector means selectively switching said central receiver unit to operate according to: (a) said Acquisition Mode, wherein said plurality of head-channels and said O-channel are connected to receive said omni-signal; or (b) said Analysis Mode, wherein said plurality of head-channels are connected in parallel to receive said directional signals from all the heads with each channel covering the same sub-band and with said O-channel connected to receive said omni-signal.

The central receiver unit further includes analysing means comprising direction-determining means effective during the Analysis Mode to analyze said directional signals in the head-channels to determine the direction of the detected radar signal, and frequency-determining means effective during the Analysis Mode to analyze said omni-signal in the O-channel to determine the frequency of the detected radar signal.

Such a receiver architecture provides a number of important advantages:

Thus, the dual usage of the receiver channels is a major cost-saving feature. For example, in a five-channel system, the acquisition band width may be 2500 MHz, which is wide enough to perform a very fast scan of a wide range of frequencies, including millimeter wave bands, while maintaining a high sensitivity and low susceptibility to jamming signals. In the preferred embodiment of the invention described below, the common base band of the RF head is within the range of 2500-5000 MHz (2.5-5.0 GHz), and each of the different sub-bands transmitted to the analyzing means for analysis during the Analysis Mode is within the range of 500-1000 MHz. Determination of the various parameters of the detected signal, including instantaneous direction finding (IDF), is performed at the same 500 MHz band width by configuring the channels for parallel reception at a single 500 MHz band. At this band width it is easy and inexpensive to resolve co-pulsed data.

Another major cost-saving feature is the minimization of the number of channels, which also permits small size, low power consumption, and higher reliability with no sacrifice in performance. The fact that the channels may be identical (except for the O-channel) also permits flexible and modular construction and reduced development and production costs.

Further, the full dynamic range of the IDF (instantaneous direction finding) system offers the direction of arrival, as the main parameter for sorting purposes, obviates PRI (pulse repetion interval) de-interleaving and other time consuming sorting methods, and shortens the reaction time dramatically. The significance of this feature increases as the environment becomes more dense and complex (agile).

The preferred 500 MHz predetection band width is narrow enough to achieve the −65 dm required sensitivity level, and wide enough to achieve a unity probability of intercept for frequency-agile radars. The narrow band width allows a relatively well protected measurement against spurious and undesired interference in dense signal environments.

The common base-band of the RF heads (preferably within the range of 2500-5000 MHz) is such that the entire 700-17000 MHz (0.7-17 GHz) EW band may be covered using only four local oscillator frequencies. This base band is no greater than an octave; it thereby avoids harmonics. The frequency is low enough to enable use of low loss cables leading to the aircraft center, and relatively inexpensive and high performance microwave components; yet the frequency is high enough to achieve good preselection with relatively weak filters, and a high spurious-free dynamic range.

The preferred second intermediate frequency range of the sub-bands, 500-1000 MHz, is not more than an octave, and therefore enables obtaining a high spurious-free dynamic range. It is related to the frequency of the common base-band of the RF heads so that it can cover it using only three local oscillator frequencies. Yet, this frequency range is low enough to enable the use of very small and low cost signal processing elements.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a general block diagram illustrating one form of radar warning receiver constructed in accordance with the present invention;

FIG. 2 is a block diagram schematically illustrating each of the RF heads in the receiver of FIG. 1;

FIG. 3 is a block diagram schematically illustrating the central receiver unit in the receiver of FIG. 1;

FIG. 4 is a block diagram illustrating each of the four directional channels (channels 1-4) in the central receiver unit of FIG. 3

FIG. 5 illustrates the O-channel in the central receiver unit of FIG. 3;

FIG. 6 illustrates the switched multiplexer in the O-channel of FIG. 5;

FIG. 7 illustrates the switch-combiner in the central receiver unit of FIG. 3; and FIG. 8 illustrates the multiple channel digitizer in the central receiver unit of FIG. 3.

DESCRIPTION OF A PREFERRED EMBODIMENT

Overall Construction

The radar warning receiver illustrated in FIG. 1 includes a central receiver unit 2, preferably installed in the general area of the center of the aircraft or its nose equipment bay, and four identical RF (radio frequency) heads 11, 12, 13 and 14, each connected to an antenna covering a preselected sector of reception of radar signals. Thus, the four antennas cover 90° sectors of azimuth, each being installed at the extremes of the aircraft, such as the wing tips, tail and nose. The RF heads 11-14, are small enough to fit in these locations very close to their respective antennas.

Briefly, the purpose of the RF heads is to amplify the signal received by the respective antenna and to perform a frequency conversion of a selected band to a first IF (intermediate frequency) base band of 2500-5000 MHz. The converted IF signals are transmitted to the central receiver unit 2 by coaxial cables.

The central receiver unit 2 determines the band to be selected by the RF heads from a total band that would typically be 700-17000 MHz (0.7-17 GHz). This large band width could be extended to include millimeter wave frequencies. Central receiver unit 2 processes the information received from the RF heads 11-14, and produces outputs to the display, control or ECM (electronic counter-measure) systems in the aircraft.

RF Head Construction (FIG. 2)

The construction of each RF head 11-14 is shown in FIG. 2. It has an input connector 15 for receiving the RF signal from its respective antenna or from a mm wave converter.

Each RF head further includes a triplexer 16 which divides its band into three sub-bands. The signals are amplified by a selected one of two low noise amplifiers 17, 18; two outputs of the triplexer are selectively applied by switch SW1 to amplifier 17, and a third output is applied directly to amplifier 18. The foregoing outputs are selectively applied by switch SW2 to a mixer 20 which produces an output to an amplifier 22 via an isolator 24, a switch SW3, and a filter 26. Filter 26 is connected directly to amplifier 18 via switch SW3 and a directional coupler 28.

The three sub-bands of the triplexer 16 are mixed with a selected one of four frequencies from a local oscillator 30 in order to select the desired sub-band and to convert it to the common base band. Local oscillator 30 is capable of outputting four frequencies to mixer 20, as selected by a switch SW4. It will thus be seen that by proper operation of switches SW1, SW2 and SW4, it is possible to select any one of seven sub-bands and to convert them by the four local oscillator frequencies to the common IF base band.

The converted signal is filtered by filter 26 having a pass-band of 2.5-5.0 GHz, amplified by amplifier 22, and transmitted by a coaxial cable (having an isolator 32 to prevent reflections) to the central receiver unit 2 of FIG. 1. It will thus be seen that unit 2 receives four such IF output signals, one from each of the four RF heads 11, 12, 13 and 14, and that the frequencies of these output signals have all been converted to a common base band of 2500-5000 MHz (2.5-5.0 GHz).

Central receiver unit 2 determines the sub-band for operation and feeds this information to control circuitry 34 in each RF head 11-14. Control circuitry 34, among other functions, drives switches SW1-SW4 in each RF head in accordance with the selected sub-band for operation. The total switching time would be about 0.1 us.

Each RF head assembly may be implemented in the form of a single microstrip assembly, and its local oscillator 30 may be in the form of separate dielectric resonating oscillators or comb-generator switched filter banks to achieve small size and low cost.

Central Receiver Unit 2 (FIG. 3)

The central receiver unit 2 is illustrated in FIG. 3. It includes a power divider 41-44, and also a separate channel 51-54, for each of the four RF heads 11, 12, 13, 14 (FIG. 1). The central receiver unit 2 includes a further channel 55, called an O-channel, for receiving and processing signals from all four RF heads.

The signal from each RF head is split by its respective power divider 41-44 into a first part which is fed to its respective channel 51-54 as a directional signal (IDF), and a second part which is fed to a switch-combiner network 46. The latter network combines the four directional signals from the four RF heads and produces a combined omni-signal (omni directional) which is split and fed to each of the four head channels 51-54, and also to the o-channel 55.

The signals from the five channels 51-55 are processed in each channel and then fed to a muliple channel digitizer 56, wherein they are digitized in parallel, processed, and the relevant parameters outputted in digital form to a digital pre-processor 58 and then to the main radar warning receiver computer 60. Pre-processor 58 performs some fast sorting on the received signals, based on their measured parameters, in order to control the data flow into the computer and to prevent its overloading. Computer 60 analyzes the signals, and performs sorting, correlation, averaging and identification operations, and outputs the processed data to display and control systems in the aircraft. The main radar warning receiver computer 60 also outputs control signals to the receiver controller 62, the latter controlling the overall operation of the radar warning receiver, including the selection of the sub-bands to the RF heads, and the control of the local oscillator assembly 64 of the central receiver unit 2.

Structure of Channels 51-55

FIG. 4 illustrates the structure of each of the head channels 51-54 which receive the direction (IDF) signals from their respective RF heads 11-14 via their respective power dividers 41-44, and which also receive the omni-signal from the switch/combiner 46. FIG. 4 also illustrates the local oscillator assembly 64 of the central receiver unit 2 which is connected to the head channels by a mode selector switch indicated by switches MS1, MS2. The latter switches, as described below, select either an Acquisition Mode of operation or an Analysis Mode of operation of the central receiver unit.

FIG. 4 illustrates the construction only of head-channel 51 for RF head 11, it being appreciated that the three remaining head-channels 52-54 for RF heads 12-14 are of identical construction. The O-channel 55, however, is of a different construction, and is therefore illustrated separately in FIG. 5.

Each of the four head-channels 51-54 includes, in addition to the mode selector switches MS1 and MS2, a mixer 66 which converts a selected 500 MHz band of the IF signal from the respective RF head to a second IF signal of a band width of 500-1000 MHz (0.5-1.0 GHz). For this purpose, each of the head-channels includes a triplexer 68 and a switch SW5 for selecting any one of the three bands of 2.5-3.5 GHz, 3.5-4 GHz and 4-5 GHz. The local oscillator assembly 64 in the central receiver unit 2 (FIG. 3) outputs three local oscillator frequencies of 3.5 GHz, 4.0 GHz and 4.5 GHz, which frequencies are selected by a further switch SW6 and inputted into a power divider 70 for application to the mixer 66 via mode selector switch MS1. It will thus be seen that the desired band may be selected using only the three local oscillator frequencies of the oscillator assembly 64.

The IF signal outputted from mixer 66 is passed through a filter 72 having a band width of 0.5-1.0 GHz and is then fed into a logarithmic IF amplifier 74 which performs the detection and outputs a 60 dB dynamic-range video signal.

O-channel 55 is illustrated in FIG. 5. It also includes a mixer 76 and a triplexer 78 having the same three frequency bands as triplexer 68 in each of the head-channels 51-54, which frequency bands are selected by a switch SW7. However, as distinguished from the head-channels 51-54, triplexer 78 of the O-channel 55 has only a single input, namely the omni-signal input from the switch/combiner 46 (FIG. 3). Mixer 76 in O-channel 55 also receives the selected frequency of the local oscillator assembly 64 (FIG. 4) during the Analysis Mode of operation.

Acquisition Mode and Analysis Mode

The Acquisition Mode of operation is selected by positioning mode selector switch MS1 to select the Acquisition Mode, and positioning mode selector switch MS2 to select the omni-input signal in all four of the head-channels 51-54 and also in the O-channel 55. In this way, each of the channels covers a different 500 MHz sub-band, and together they contiguously cover the entire 2.5 GHz of the selected RF sub-band, provided the SW5/7 switches select bands corresponding to the L.O. frequencies supplied to mixers 66/76.

In the Analysis Mode of operation, mode selector switch MS2 connects the directional (IDF) input to each channel except the O-channel which has only an omni-input, and mode selector switch MS1 connects all the channels to the common local oscillator signal derived from power divider 70 and frequency selected by SW6. Switches SW5 and SW7 of the head channels 51–55 select the desired 500- MHz sub-band of the selected RF band whose signals are intended to be received for parameter measurement and analysis.

It will thus be seen that during the Acquisition Mode, as selected by mode selector switches MS1, MS2, the four head-channels 51–54, and also the O-channel 55, are all connected to receive the omni-signal. This produces a strong omni pattern over a wide frequency band with the channels covering different contiguous sub-bands. During the Analysis Mode, the four head channels 51–54 are connected in parallel to receive the directional signals (IDF) from all the RF heads, with each channel covering the same sub-band of 500 MHz; the O-channel remains connected to receive the omni-signal, of that same sub-band.

Measurement of Detected Signal Parameters

The omni-channel signal outputted from mixer 76 in O-channel 55 is passed through a band pass filter 80 (0.5 GHz–1.0 GHz) to a logarithmic IF amplifier 82, corresponding to amplifier 74 in each of the direction channels 51–54. The output of amplifier 82 in the O-channel 55 is a video signal representing the amplitude parameter of the detected radar signal.

A signal from amplifier 82 is also fed to a discriminator 84 in the O-channel 55, which discriminator outputs a video signal representing the frequency parameter of the detected radar signal.

O-channel 55 illustrated in FIG. 5 further includes a fine channelizer option controlled by a switch SW8 to direct the output of filter 80 to a switched multiplexer 86 before the signal is fed to the logarithmic IF amplifier 82. FIG. 6 illustrates the construction of switched multiplexer 86. Thus, the 500 MHz signal from filter 80 is fed to a four way power divider 88 splitting the signal into four signals each fed to a separate band pass filters 91–94 individually switchable to enable any possible combination of frequencies to be passed to the logarithmic amplifier 82 via another four-way power divider 96.

O-channel 55 illustrated in FIG. 5 further includes a superhet receiver channel option using the switched multiplexer as a preselector filter. This latter channel includes a voltage tuned oscillator 100 (e.g. 0.6–1.2 GHz) serving as a local oscillator and feeding a mixer 102. Mixer 102 is also supplied with the output of the switched multiplexer 86 via directional coupler 104 and switch SW10, and outputs its signal via amplifier 106 to a selected one of three band pass filters 107, 108, 109 via switches SW11, SW12, the signal from the selected filter being outputted to another logarithmic IF amplifier 110 and appearing as the superhet output signal SHR VIDEO.

The foregoing local oscillator signals fed to the mixers in the direction channels 51–54 and O-channel 55 may be derived from crystals or separate dielectric resonating oscillators.

Switch/combiner 46 in the central receiver unit 2 as illustrated in FIG. 3 includes a single-pole four-throw switch 112, as shown in FIG. 7, an amplifier 114, and a power divider 116 producing the four omni-directional signals to head channels 51–54. The switch/combiner also produces the omni-signal via a directional coupler 118.

The multiple channel digitizer 56 in the central receiver unit 2, as illustrated in FIG. 3, is more particularly seen in FIG. 8. It includes seven video inputs, namely the four inputs from the four head channels 51–54, and the three inputs from the O-channel 55. These seven input signals can be processed to produce the various parameters of the detected radar signal. Thus, the four inputs from the four head channels 51–54 can be processed to determine the direction parameter of the detected radar signal in the Analysis Mode, or the coarse frequency in Acquisition Mode; the log video input from amplifier 82 of the O-channel 55 includes the amplitude parameter of the detected radar signal as well as the time-of-arrival and pulse width; the frequency video input from discriminator 84 of O-channel 55 includes the frequency parameter of the detected radar signal; and the superhet video input from amplifier 110 of O-channel 55 includes the amplitude, time-of-arrival and pulse-width parameters of the detected radar signal, for cases requiring extreme sensitivity or selectivity.

Multiple channel digitizer 56 illustrated in FIG. 8 includes low pass filter 120 which are selectively switchable by switches SW10–SW11. For higher sensitivity detection of wide pulses, a narrow filter will normally be used to suppress the noise and achieve a more accurate measurement. Multiple channel digitizer 56 includes a further switch SW12 for selecting either the log video output of amplifier 82 of O-channel 55, or the superhet video output from amplifier 110 of the O-channel where this option is to be exercised.

The main channel (log video, or SHR VIDEO, according to the selection) is fed to a threshold circuit 122 which determines if a significant signal exists, and if so, it triggers an analog-to-digital converter 124 to convert the signal to digital form before being inputted into the logic circuits 126. Threshold circuit 122 also triggers the analog-to-digital converters 124 which convert the analog information from the remaining channels to digital form before this information is inputted into the logic circuit 126. Threshold circuit 122 further triggers the logic circuit 126 to collect the signal parameters, which may be measured on a single pulse basis.

Logic circuit 126 outputs the various parameters of the detected radar signal, as follows:

the direction of arrival parameter is determined by comparing the amplitude of the four IDF video signals of the four direction channels 51–54. The two channels having the largest signals are selected, producing the correct quadrant of arrival, and are then subtracted to produce the angular deviation from the center of a quadrant. The remaining two direction channels serve as guard antennas, and should their signal level be too high, the direction of arrival measurement will be dismissed as inaccurate.

In the event the detected radar signal is a continuous wave signal, its direction of arrival will be determined using the high resolution SHR channel, and by sequentially sampling the four quadrants by the O-channel 55.

The amplitude parameter is determined by the magnitude of the LOG video signal from amplifier 82 of O-channel 55, or in case of use of the SHR option, the SHR video signal from amplifier 110.

The frequency parameter is determined by the output signal of discriminator 84 of the O-channel 55 (FIG. 5).

The time of arrival parameter and pulse width parameter are determined from the log video (or SHR video) input.

The foregoing techniques for determining the parameters of detected radar signals are well known, and therefore further details of the construction or operation of circuitry for performing these functions are not set forth herein.

Main Functions of the Preprocessor, Controller and Computer

Digital preprocessor 58 in the central receiver unit illustrated in FIG. 3 acts as a programmable multi-channel filter which limits the amount of data flow to the main computer 60. The real time decision whether or not to allow an incoming signal to reach computer 60 is based on the signal parameters. In the Acquisition Mode, the frequency and amplitude parameters will be the main determining parameters; whereas in the Analysis Mode, the direction of arrival and frequency will be the main determining parameters.

Receiver controller 62 in the central receiver unit illustrated in FIG. 3 is a digital sub-system performing the control tasks which set the receiver in its various modes of operation. This controller outputs the signals to the various control lines which govern the central receiver unit and the RF heads fast switches. Typical activities of the controller:

(a) start the Acquisition Mode in a particular 2.5 GHz band;
(b) dwell in the band for a determined time;
(c) start Analysis Mode in an active 500 MHz band;
(d) dwell in the band to collect a sufficient amount of data;
(e) blank out disturbances using the fine chanellizer;
(f) controll the frequency of the SHR;
(g) perform sequencial measurements of continuous wave signals by switching the IF switch/combiner (46, FIG. 3).

The main computer 60 performs a number of functions, including the following:

(a) processing of the received signals by sorting them into consistent pulse trains;
(b) data reduction on pulse trains, such as parameter averaging and variance or pattern calculations;
(c) classification of pulse trains as belonging to a specific emitter type, using static tables of radar parameters;
(d) identification of pulse trains by corelating them to previously received signals of the same emitter;
(e) threat/no-threat decisions based on positive identification;
(f) performing a prioritized scan of the frequency and direction domain, looking for new emitters by programming the controller;
(g) threat warning and display to pilot;
(h) threat parameter listing to electronic counter-measure equipment for effective counter-measure operation;
(i) built-in self testing to assure proper operation of all system parts.

Many computers are available today which can be programmed according to known programming techniques for performing the foregoing operations, and therefore further details of the computer and its operation are not described. For purposes of example, there is set forth below a list of components and vendors supplying them together with their catalog numbers, which may be used in implementing the system described above:

DESIGN EXAMPLE

RF HEAD

| Component | Vendor/Part |
|---|---|
| Triplexer 0.7–7, 7–12, 12–17 GHz | Filtronics SMX0016 (Modified) |
| Pin SPDT Switch SW1, SW2, SW3 | General Microwave DM870 |
| Low Noise Amplifier 7–17 GHz | TRW Microwave MJ-1020 (Modified) |
| Low Noise Amolifier 2–7 GHz | MITEQ AFD3-2080 |
| Coupler 10 dB 2–18 GHz | MERRIMAC C5MR-10-10G |
| Mixer 2–18 GHz | TRW Microwave MX2181 |
| Pin SP4T Switch 4–12.4 GHz | ALPHA MT3674-E |
| 4 L.O. Sources 5,7,9.5,12 GHz | NARDA NSO-FG, HI, JL SERIES |
| Band Pass Filter 2.5–5.0 GHz | K & L 6-IB30-3750/2500 |
| Amplifier 2.5–5.0 GHz | TRW MICROWAVE MG-1120 |

CENTRAL RECEIVER UNIT

| Component | Vendor/Part |
|---|---|
| 4 2-Way Power Divider 2.5–5 GHz | NARDA 4324-2 |
| SWITCH/COMBINER | |
| Pin SP4T Switch 2.5–5 GHz | ALPHA MT3674-B2 |
| RF Amplifier | TRW MICROWAVE MG-1120 |
| Coupler 10 dB | MERRIMAC C5MT-10-10G |
| 4-Way Power Divider | Triangle Microwave YF-55 |
| 3 Sources L.O. 3.5,4.0,4.5 GHz | NARDA NSO-FG Series |
| 2 3-Way Power Divider | Triangle Microwave YF-55 |
| 5-way Power Divider | Triangle YF-55 + Merrimac C5MT-10-10 |
| Pin SP3T Switch | Alpha MT3673-B2 |
| CHANNEL 0-4 | |
| 2 Pin SPDT Switch | General Microwave DM870 |
| Triplexer 2.5–3.5,3.5–4,4–5 GHz | Filtronics SMX0023 (Modified) |
| Pin SP3T Switch | Alpha MT3673-B2 |
| 2 Amplifier 2.5–5 GHz | TRW Microwave MG-1120 |
| Mixer | TRW Microwave MX2181 |
| Band Pass Filter 0.5–1.0 GHz | K & L 6-IB30 750/500 |
| Log IF Amplifier | RHG ICLW750 |
| CHANNEL O SUPPLEMENT | |
| Limiting Discriminator | RHG ICDT-750 |
| Amplifier 0.5–1.0 GHz | Avantek GPD-1003 |
| 2 Couplers | Merrimac C5MT-10-10G |
| SHR | |
| Mixer | RHG |
| Voltage Tuned Oscillator | Avantek VTO-8060 (Modified) |
| Amplifier | Avantek GPD-1003 |
| 3 Band Pass Filter | K & L 8-IB30-160/20, 3, 0.5. |
| Log IF Amplifier 160 MHz | RHG-ICLT 150B |
| DIGITIZER | |
| 13 CMOS SPDT Switch | Analog Devices AD7592DI |
| 10 Low Pass Filter | K & L 5-LIB 10, 2 |
| 5 Analog to Digital Converter | Analog Devices HAS-0802 |

It will be appreciated that while the invention has been described with respect to one preferred embodiment, this emodiment is set forth purely for purposes of example, and many other variations, modifications and applications of the invention may be made.

What is claimed is:

1. A radar warning receiver for detecting and analyzing radar signals, comprising:
a plurality of RF heads each tuned to a predetermined frequency band and connected to an antenna covering a preselected sector of reception of radar signals, each of said heads including a frequency converter converting the received signals to a common frequency base-band and producing an output signal in said base band corresponding to the signal received by its antenna;
and a central receiver unit receiving said signals from the RF heads;
said central receiver unit comprising:
a plurality of channels, one for each RF head, for receiving and processing the signals from the respective head; and
mode selector means for selectively switching said central receiver unit to operate according to:
(a) an Acquisition Mode, wherein said plurality of channels are connected to cover contiguous sub-bands of said base band; or
(b) an Analysis Mode, wherein said plurality of channels are connected in parallel to cover the same sub-band of said base band.

2. The receiver according to claim 1, wherein said plurality of channels include a head-channel for each RF head, for receiving and processing the signals from the respective head; and an O-channel for receiving and processing the signals from all the RF heads combined; and wherein said central receiver unit further includes:
splitting means for splitting the signals from each RF head to produce a directional signal from each head and an omni-signal derived by combining the base band signals from all said heads; and
means for feeding the directional signals of each head to its respective channel, and the omni-signal to all the channels and to said O-channel;
said mode selector means selectively switching said central receiver unit to operate according to:
(a) said Acquisition Mode, wherein said plurality of head-channels and said O-channel are connected to receive said omni-signal; or
(b) said Analysis Mode, wherein said plurality of head-channels are connected in parallel to receive said directional signals from all the heads with each channel covering the same sub-band and with said O-channel connected to receive said omni-signal.

3. The receiver according to claim 2, wherein said central receiver unit further includes analysing means comprising direction-determining means effective during the Analysis Mode to analyze said directional signals in the head-channels to determine the direction of the detected radar signal, and frequency-determining means effective during the Analysis Mode to analyze said omni-signal in the O-channel to determine the frequency of the detected radar signal.

4. The receiver according to claim 3, wherein said frequency-determining means comprises a discriminator in said O-channel for measuring the frequency of the omni-signal therein during the Analysis Mode.

5. The receiver according to claim 3, wherein said analyzing means further includes amplitude measuring means effective, during the Analysis Mode, to analyze said omni-signal in the O-channel to determine the amplitude of the detected radar signal.

6. The receiver according to claim 5, wherein said amplitude measuring means comprises a log IF amplifier in said O-channel for measuring the amplitude of the omni-signal therein during the Analysis Mode.

7. The receiver according to claim 3, wherein said analyzing means further includes means in said O-channel for measuring the time of arrival and pulse-width of the omni-signal therein during the Analysis Mode.

8. The receiver according to claim 3, wherein said splitting means for splitting the signals from each RF head includes a power divider, and switching means for selectively switching the outputs of the RF heads to said power divider in order to select the head of a particular direction for analysis, or to blank out a head of a particular direction from reception.

9. The receiver according to claim 3, wherein said analyzing means comprises:
a separate analysis channel for each of said head-channels and each of said outputs of the O-channel;
a plurality of selectively-switchable low-pass filters for each of said analysis channels to permit matching of the channel to the received signal;
an analog-to-digital converter in each of said analysis channels for converting the signal of the respective channel to digital form if above a predetermined threshold;
and a logic circuit receiving the digital outputs of all said channels and determining therefrom direction of arrival, amplitude, frequency, time of arrival and pulse-width.

10. The receiver according to claim 1, wherein each of said channels includes means for converting the common frequency base-band to a different sub-band in each channel for analysis by said analyzing means.

11. The receiver according to claim 10, wherein the frequency range of each of said sub-bands and of said base-band does not exceed one octave.

12. The receiver according to claim 11, wherein said common base-band of said RF heads is within the range of 2500–5000 MHz, and each of said different sub-bands transmitted to said analyzing means for analysis during the Analysis Mode is within the range of 500–1000 MHz.

13. The receiver according to claim 1, wherein there are four RF heads, each tunable to cover a dynamic range of 700–17000 MHz.

14. A radar warning receiver for detecting and analyzing radar signals, comprising:
four RF heads each tunable to cover a dynamic range of 700–17000 MHz and connected to an antenna covering a preselected sector of reception of radar signals, each of said heads including a frequency converter converting the received signals to a common frequency base-band and producing an output signal in said base-band corresponding to the signal received by its antenna;
and a central receiver unit receiving said signals from the RF heads;
said central receiver unit comprising:
a plurality of channels, one for each RF head, for receiving and processing the signals from the respective head;
mode selector means for selectively switching said central receiver unit to operate according to:
(a) an Acquisition Mode, wherein the plurality of channels are connected to cover contiguous sub-bands of said base-band; or
(b) an Analysis Mode, wherein the plurality of channels are connected in parallel to cover the same sub-band of said base-band.

15. The receiver according to claim 14, wherein said plurality of channels include a head-channel for each RF head, for receiving and processing the signals from the respective head; and an O-channel for receiving and processing the signals from all the RF heads combined; and wherein said central receiver unit further includes:
splitting means for splitting the signals from each RF head to produce a directional signal from each head and an omni-signal derived by combining the base-band signals from all said heads; and
means for feeding the directional signals of each head to its respective channel, and the omni-signal to all the channels and to said O-channel;
said mode selector means selectively switching said central receiver unit to operate according to:
(a) said Acquisition Mode, wherein said plurality of head-channels and O-channel are connected in parallel to receive said omni-signal; or
(b) said Analysis Mode, wherein said plurality of head channels are connected in parallel to receive said directional signals from all the heads with each channel covering the same sub-band and with said O-channel connected to receive said omni-signal.

16. The receiver according to claim 15, wherein said central receiver unit further includes analyzing means comprising direction-determining means effective during the Analysis Mode to analyze said directional signals in the head-channels to determine the direction of the detected radar signal, and frequency-determining means effective during the Analysis Mode to analyze said omni-signal in the O-channel to determine the frequency of the detected radar signal.

17. The receiver according to claim 16, wherein said frequency-determining means comprises a discriminator in said O-channel for measuring the frequency of the omni-signal therein during the Analysis Mode.

18. The receiver according to claim 16, wherein said analyzing means further includes amplitude measuring means effective, during the Analysis Mode, to analyze said omni-signal in the O-channel to determine the amplitude of the detected radar signal.

19. The receiver according to claim 18, wherein said amplitude measuring means comprises a log IF amplifier in said O-channel for measuring the amplitude of the omni-signal therein during the Analysis Mode.

20. The receiver according to claim 18, wherein said analyzing means further includes means in said O-channel for measuring the time of arrival and pulse-width of the omni-signal therein during the Analysis Mode.

* * * * *